Figure 1:
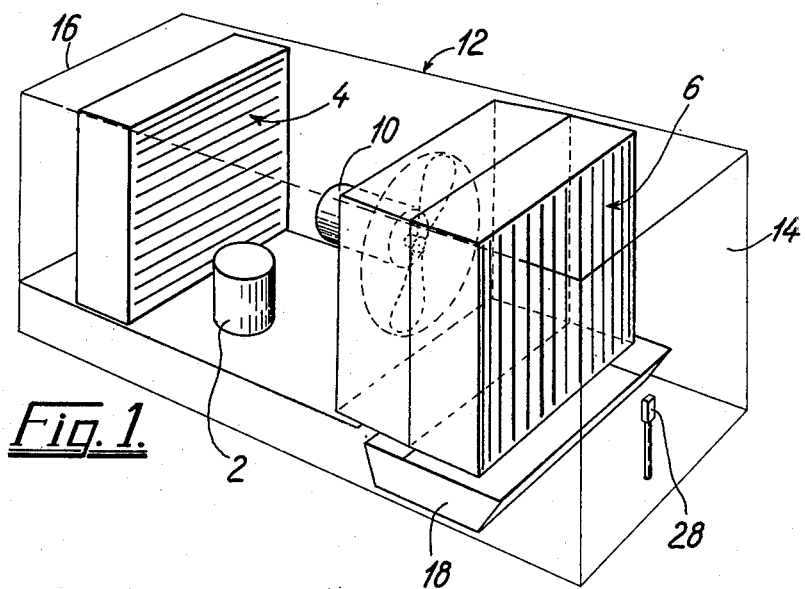

United States Patent [19]

Sminge et al.

[11] 4,291,542
[45] Sep. 29, 1981

[54] AIR DRYING APPARATUS OF THE CONDENSATION TYPE

[75] Inventors: Poul E. Sminge, Randers; Svend I. Thoegersen, Baelum, both of Denmark

[73] Assignee: A/S Dantherm, Skive, Denmark

[21] Appl. No.: 149,629

[22] Filed: May 14, 1980

Related U.S. Application Data

[63] Continuation of Ser. No. 870,377, Jan. 18, 1978, abandoned.

[30] Foreign Application Priority Data

Jan. 19, 1977 [GB] United Kingdom ............... 2112/77

[51] Int. Cl.³ ..................... F25D 21/06; F25B 41/00
[52] U.S. Cl. ..................................... 62/156; 62/209
[58] Field of Search ............. 62/155, 156, 180, 186, 62/209

[56] References Cited

U.S. PATENT DOCUMENTS 3,899,895  8/1975  Blanton et al. .................. 62/155
4,003,729  1/1977  McGrath ....................... 62/186 X

FOREIGN PATENT DOCUMENTS 1912613  9/1970  Fed. Rep. of Germany .
2400464  7/1975  Fed. Rep. of Germany .
2100180  11/1976 Finland .
891576   3/1962  United Kingdom .
975197   11/1964 United Kingdom .

*Primary Examiner*—William E. Wayner
*Attorney, Agent, or Firm*—Craig and Antonelli

[57] ABSTRACT

A condensation air drying apparatus comprising a refrigeration system, the evaporator of which is used for cooling an air flow to or below its dew point whereby the moisture in the air as drawn through the cooler by a fan is condensed on the cooler and drained off. A switch over valve enables the cooler to be temporarily connected as a condenser in the refrigerator system, whereby the cooler is heatable for defrosting. A temperature sensor mounted direct on the cooler serves to control the fan power for optimal economy in normal operation and to detect frost formation and control start and stop of the defrosting cycles in response to such detection. The control equipment may include an air temperature sensor adjusting the working characteristic of the cooler temperature sensor in an optimal manner according to the temperature of the air to be dried.

11 Claims, 3 Drawing Figures

U.S. Patent      Sep. 29, 1981      4,291,542

AIR DRYING APPARATUS OF THE CONDENSATION TYPE

This is a continuation of application Ser. No. 870,377, filed Jan. 18, 1978 now abandoned.

This invention relates to an air drying apparatus of the condensation type, comprising a cooler element and a fan for creating an air flow against or through the cooler element, means for normally cooling the cooler element to cause condensation of the moisture in said air flow and means for temporarily heating the cooler element to cause defrosting thereof, and control means for controlling the operation of said heating means. In such an apparatus it is customary to use an air cooler constituted by the evaporator of a refrigeration system, the heat developing condenser of which is mounted in the air flow downstream of the cooler. The air passing the cooler is hereby cooled to below its dew point, such that the moisture in the air condensates on the cooler and is drained off as water, whereafter the cooled air serves the necessary cooling of the condenser and is at the same time reheated by the condenser. The result is that the air flow leaves the apparatus in dried condition at approximately unchanged temperature.

Especially for drying relatively cold air or air of a low specific humidity with a reasonably good capacity and efficiency it is necessary to operate the cooler at a temperature below 0° C., and it is almost inevitable, therefore, that frost builds up on the cooler element. This makes the cooler less efficient because a frost layer is heat insulating, so the frost shall have to be removed from time to time. In usual systems such a defrosting is easy to carry out, because as well known switch over means may be provided operable to interchange the connections and therewith the functions of the evaporator and the condenser of the refrigerating system, whereby the cooler or evaporator is easily and rapidly heatable for defrosting purposes.

It is known to effect automatic control of the said switch over means at a simple time basis, but this is not an ideal control manner, because under varying circumstances (air temperature and humidity) the requirements as to the frequency and length of the defrosting periods may vary considerably. A non-ideal control may give rise either to insufficient defrosting or to oversufficient defrosting which in both cases results in a decreased efficiency of the drying system.

It is the purpose of this invention to provide an improved drying system of the type referred to which is controllable so as to show generally increased efficiency.

According to the invention there is provided an air drying apparatus of the aforementioned type in which temperature sensing means are mounted in direct heat connection with said cooler element, preferably at the side or end thereof where the air flow leaves the cooler element, said sensing means being operatively connected with the fan and/or said control means so as to cause a reduction of the fan effect in response to the cooler temperature rising above a predetermined operational value and/or, respectively, so as to cause actuation of said heating means for defrosting the cooler in response to the cooler temperature falling to a predetermined minimum. The said temperature sensing means will sense a temperature resulting from the combined cooling effect of the refrigerant inside the cooler and the heating effect of the cooler surroundings, normally represented by the said air flow. A relatively high sensor temperature will be indicative of the fan operating at such high capacity that the cooler is unable to cause sufficient cooling of the air flow, and it will increase the condensation efficiency, therefore, when according to the invention the fan power is automatically reduced in this situation, since for a constant cooling effect of the cooler the resulting slower or weaker air flow may then generally be cooled to a lower temperature. Should the sensor temperature decrease into the relatively low range in which maximum condensation is effected this will be indicative of the possibility that the cooler has sufficient cooling capacity to effectively cool a stronger air flow, and again it will thus increase the condensation efficiency when in this situation the fan is automatically caused to operate at increased power so as to supply to the cooler just as much air as can be effectively cooled for condensation of as much water as possible, without the cooling resulting in rapid frost formation on the cooler.

Should the sensor temperature fall to below the said effective condensation range this will be indicative of frost formation on the cooler, as a frost layer acts as a heat insulation which prevents the air flow from heating the cooler, whereby the refrigerant will soon cause the sensor temperature to decrease. Therefore, when according to the invention the detection of such a further temperature drop is used for initiating the defrosting operation it will automatically be ensured that this operation is initiated only when it is actually needed and not in a functionally arbitrary manner as when initiated on a pure time basis as known in the art. Hereby the system is safeguarded against insufficient defrosting causing low condensation efficiency of the system as well as against over-sufficient defrosting causing inoperative working time of the system.

The period of time necessary for completing the defrosting operation will depend first of all, of course, of the heating capacity of the cooler when connected to the said heating means or in other words when temporarily operating as a condenser of the refrigerating system, and of the thickness of the frost layer as well as of the heating capacity of the air outside the frost layer. Each of these parameters may vary according to the circumstances, and it is no ideal solution when according to the prior art the length of the defrosting period is defined at a fixed time basis. The period may then easily be insufficient, such that at the end thereof there is still frost on the cooler, or oversufficient such that valuable effective operation time of the system is wasted by unnecessary defrosting operation. However, when according to the invention the said cooler temperature sensing means are additionally used for detecting the attainment of a maximum defrosting temperature whereby the frost has by necessity disappeared, and to switch back the system into normal operation in response to such detection, it will be ensured hereby that the length of the defrosting period is optimized to the actual requirements. The frost will have disappeared, and the normal operation of the system is reestablished as soon as it has disappeared, no matter the absolute value of said various parameters.

Among the said parameters the temperature of the air in said air flow is of further importance in that it affects the optimal water condensation temperature. When the air is relatively warm it normally shows a relatively high humidity and a high heating effect on the cooler element. It would be desirable, therefore, that in the case of a relatively warm air flow the critical cooler sensor temperatures for bringing about the discussed control functions are generally increased, as well as decreased when the temperature of the air flow is relatively low, and it is an important additional feature of the invention, therefore, that an air temperature sensor may be so provided and operatively connected with said temperature sensing means that the cooler element temperature level or levels, by which the sensing means perform their said control operations, are generally increased in automatic response to increase of the temperature of the air as blown against the cooler element.

Figure 2:
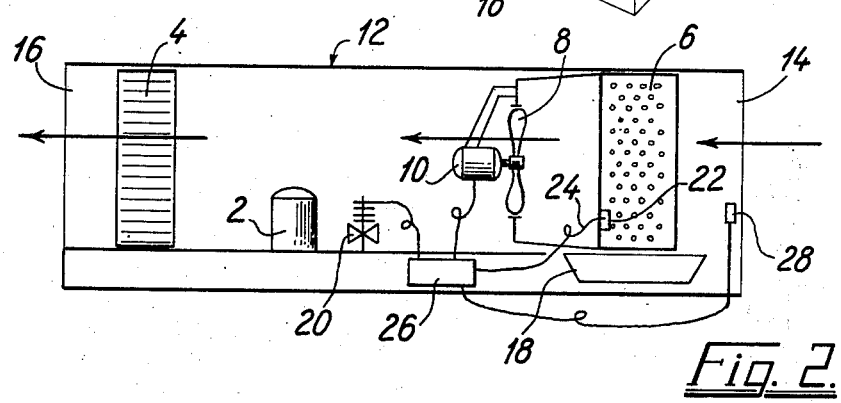
Figure 3:
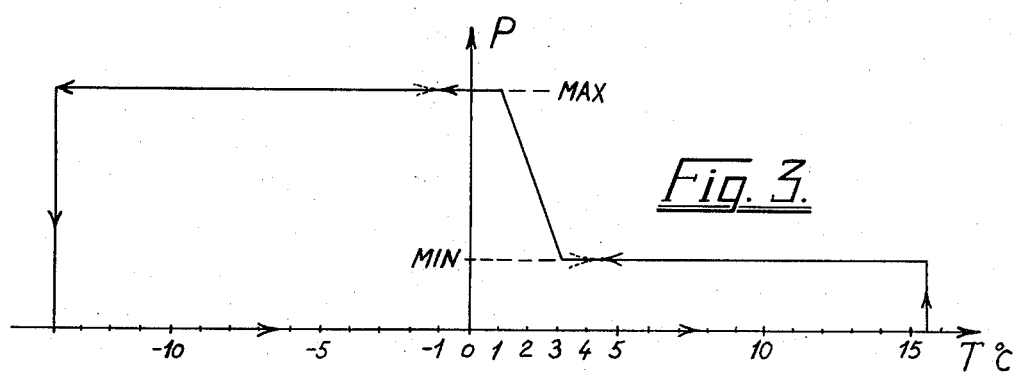

In the following the invention is described in more detail, by way of example, with reference to the accompanying drawing, in which:

FIG. 1 is a general perspective view of a drying system according to the invention, FIG. 2 is a schematic side view thereof, and FIG. 3 is a graphic diagram of the fan power as a function of the cooler surface temperature.

The system shown in FIGS. 1 and 2 comprises a refrigeration compressor 2 of the hermetic type operable at on-off conditions, a condenser 4, an evaporator 6 and a fan 8 driven by a motor 10 placed between the condenser and the evaporator so as to draw air through the evaporator and then blow it through the condenser. The said elements are mounted in a tube like housing 12 having an air intake end 14 and an air outlet end 16 and a water collection tray 18 mounted underneath the evaporator 6. The system so far described is fully conventional. In operation, the evaporator 6 serves to cool the air so as to cause the air humidity to condensate and get collected as water in the tray 18, from which the water may be drained off in any suitable manner. The air then passes the condenser 4 so as to effect the desired cooling thereof and be reheated before it leaves the system through the outlet end 16. In this manner the air, dried by the said condensation of the moisture, is returned to the room in which the drying apparatus is placed, and gradually the room air will thus be dried without any substantial change of the air temperature generally.

As mentioned, if frost is likely to occur on the evaporator or air cooler 6 it will be necessary to effect defrosting from time to time, and it is well known that this may be done in a simple manner by inverting the operation of the condenser 4 and the evaporator 6 by means of a switch over control valve 20.

According to the present invention there is mounted in direct connection with a surface portion of the air cooler 6 a temperature sensor 22 (FIG. 2) connected through a wire 24 to a control unit 26 serving to control the power of the fan motor 10 and the operation of the switch over valve 20. The sensor 22 is mounted adjacent the rear end of the air cooler, i.e. at a place where the air is cooled to its lowest temperature and where consequently frost is liable to occur in the first instance; moreover the sensor is mounted adjacent the bottom of the cooler 6, where most water is present, such that the formation of frost or ice will start in the mounting area of the sensor 22.

As long as the temperature of the sensor 22 is relatively high, e.g. above 3° C., this will be indicative of the air needing a relatively high degree of cooling, i.e. that the air should be drawn relatively slowly through the cooler. Therefore the control unit 26 is so adapted that it causes the fan motor 10 to operate at an operational minimum speed when the sensor 22 senses a cooler surface temperature above a predetermined limit e.g. of said 3° C. The sensor temperature falling below this limit, e.g. down to 1° C., will be indicative of the system being able to effectively cool a larger amount of air, and accordingly the unit 26 is designed so as to cause the fan power to increase gradually in response to a gradual fall of the sensor temperature down to about the freezing point.

Now, if the sensor temperature continues to fall upon the fan being adjusted to maximum speed or generally to fall beyond a predetermined low value this will be indicative of frost formation adjacent the sensor 22, namely of the air not being able to heat the cooler surface to about the freezing point due to the insulating effect of the frost, and the control unit 26 is designed so as to be able to detect this situation and in response thereto cause the switch over valve 20 to invert the operation of the condenser 4 and the evaporator 6 to effect heating and defrosting of the latter.

Though the defrosting process will normally be terminated when the temperature of the sensor 22 rises to just above 0° C. it is nevertheless preferred to let the unit 26 maintain the valve 20 in its inversed position until the sensor temperature reaches a still higher value, e.g. some 12° C. or higher, because it will then be ensured that most of the water originating from the molten frost will have dripped off from the element 6, whereby it will not form new frost or ice when the element 6 is thereafter again used as a cooler element. Of course, a timing control unit might serve the same purpose.

The described relation between the sensor temperature T and the fan power P is illustrated graphically in FIG. 3, based at the said temperature examples, and it will be noted that preferably the unit 26 is operable to completely stop the fan 8 during the entire defrosting period, since such stoppage will promote the defrosting when the air is not too warm. Additionally, the condenser 4 now acting as an evaporator will then not be cooled by any air flow, and a relatively high evaporator temperature promotes a higher condenser temperature, i.e. a relatively high defrosting temperature of the element 6. Besides, if the fan was allowed to operate at full speed during the defrosting period this would involve increased vaporization of the water being present on the cooler surface portions, this vaporization itself involving a cooling effect and thus a counteraction of a rapid heating of the cooler element for defrosting purposes.

In this manner the frequency and the length of the defrosting periods will be controlled in a practically optimal manner according to the requirements, as the defrosting will be initiated whenever a real defrosting need arises and be terminated in response to the frost really having disappeared.

If the air being treated is in advance relatively cold its effect of heating the cooler surface and therewith the sensor 22 will be correspondingly poor, and besides its absolute moisture contents will be relatively low. For being indicative of frost formation, therefore, the temperature of the sensor 22 will in that case be somewhat lower than in case of "normal" room air temperature, and correspondingly the frost indicating sensor temperature will be somewhat higher when the air temperature is above the "normal" temperature.

However, according to a further and important aspect of this invention the control unit 26 may be operatively connected with an air temperature sensor 28 mounted so as to sense the temperature of the air to be treated, e.g. mounted as shown in the air inlet opening 14 of the drying apparatus, in such a manner that the operation characteristic illustrated in FIG. 3 will generally be displaced towards the left for a decreasing room air temperature and towards the right for an increasing air temperature as sensed by the sensor 28.

Of course, some frost should be allowed to occur before the defrosting is initiated, as the general efficiency or capacity of the system would otherwise be reduced, and in a practical example the system may be so adjusted that the defrosting is initiated when the cooler surface temperature has dropped to some −14° C. of the room air temperature is some 12°–14° C. Now, if the room air temperature is only 5° C. a cooler surface temperature (underneath the frost) of −14° C. would not correspond to the same amount of frost as before, because the air will have contributed less to the removal of cold from the cooler, and in that case, if the characteristic start defrosting temperature is maintained at −14° C. the general efficiency of the system will be rather poor, because most of the operation time would be used for an unnecessary defrosting of the cooler.

With the use of the sensor 28 it is easily possible to effect an automatic adjustment of the cooler surface temperature at which the defrosting is initiated, and in the above example this temperature may be some −21° C. for an air temperature of 5° C., and correspondingly higher than said −14° C. if the room air temperature is above said 12°–14° C. For a given system it is possible to define an almost optimal relation between the characteristic cooler surface temperature and the room air temperature and to design the control unit 26 for obtaining a correspondingly optimal, stepless control. However, the absolute values of the characteristic temperatures may vary considerably from system to system, according to the entire detailed design thereof.

It would be within the scope of the invention to replace the sensor 28 by some manually operated temperature "selector" if only a coarse adjustment of the start and/or stop temperature of the defrosting operation is required. The selector could be set according to the air being either "cold," "normal" or "warm."

It should be emphasized that the system according to the invention is not limited to use in connection with the primary purpose of drying air by the condensation method, as the advantages obtained by the automatic control of the fan and/or of the defrosting operation till be appreciated even when the primary purpose is to cool the air or other humid gas.

Another parameter which may change with the surface temperature of the cooler is the temperature and therewith the pressure of the refrigerant inside the cooler, and in some connections it may be possible to use a pressure guage for providing control information to the control unit 26, i.e. in such cases the pressure guage will be a simple equivalent to the temperature sensor 22.

It will be appreciated that the use of the cooler temperature sensor 22 for control purposes is of advantage both for fan control during normal operation and for defrosting control, and the system according to the invention, therefore, will be advantageous even if the sensor is used for one of these control purposes only.

Under extreme conditions it may happen that the air moisture builds up clear ice rather than frost on the surface portions of the cooler 6, and when the air is relatively warm such ice will be subjected to surface melting and thus tend to adopt a temperature close to 0° C., whereby it prevents a further and rapid temperature drop of the sensor 22 as would be indicative of the need of the cooler to be defrosted or deiced. In order to safeguard the apparatus against such malfunction under extreme conditions the control unit 26 may comprise a timer which causes the defrosting operation to be initiated whenever a predetermined time interval of e.g. 1–2 hours has lapsed since the end of the last defrosting operation. This may incur that defrosting may be initiated in a needless manner under other and even normal operational conditions, but needless defrosting under such conditions will result in a very rapid heating of the sensor 22 and thus in a rapid switching back to normal operation, e.g. in less than one minute, and the general efficiency of the system, therefore, will not be considerably lowered should exceptionally such short needless defrosting operation periods occur.

Principally, as far as the condensation cooling and the defrosting operations are concerned, it is unimportant how the cooler 6 is caused to be cooled, and the invention, therefore, is not limited to the use of a refrigerating system involving the use of a condenser 4 located downstream of the air flow. Correspondingly, the means for heating the cooler for defrosting purposes should not necessarily be constituted by the warm refrigerant as supplied from a compressor through a switch over valve, since other heat sources could be used, e.g. electric heating.

It is deemed unnecessary at this place to describe examples of the design of the control unit 26 in more detail, as any expert in the relevant field will be able to design a suitable unit capable of performing the control functions described hereinbefore.

What is claimed is:

1. An air drying apparatus, comprising a cooler element and a fan for creating an air flow against or through the cooler element, means for normally cooling the cooler element, means for temporarily heating the cooler element to cause defrosting thereof, and control means for controlling the operation of said heating means, characterized in that temperature sensing means are mounted in direct heat connection with said cooler element, said sensing means being operatively connected with the fan and said control means so as to cause a reduction of the fan effect in response to the cooler temperature rising above a predetermined operational value or, respectively, so as to cause actuation of said heating means for defrosting the cooler in response to the cooler temperature falling to a predetermined minimum, and wherein an air temperature sensor is so provided and operatively connected with said temperature sensing means that the cooler element temperature level or levels, by which the sensing means perform their said control operations, are generally increased in automatic repsonse to increase of the temperature of the air as blown against the cooler element.

2. An apparatus according to claim 1, wherein said apparatus is an air drying apparatus of the condensation type, and wherein said means for cooling the cooler element acts to effect condensation of moisture in said air flow.

3. An apparatus according to claim 1, wherein the apparatus is an air cooling apparatus and said means for cooling the cooler element acts to effect cooling of the cooler element to below 0° C. and cool said air flow.

4. An apparatus according to claim 2 or 3, wherein said control means is operable so as to cause both said reduction of the fan effect and said actuation of said heating means.

5. An air conditioning apparatus comprising a cooling element, a fan for creating an air flow against or through the cooling element, means for temporarily heating the cooler element to defrost same, control means for controlling the defrosting of the cooling element by temporarily heating the cooling element by means of said heating means, and a temperature sensing means mounted on the surface of the cooling element for activating said control means, wherein the temperature sensing means is further operatively connected with the fan so as to control the effect of the fan in response to the temperature of the cooling element and, respectively, so as to cause actuation of said heating means for defrosting the cooling means in response to the temperature of the cooling element falling to a predetermined temperature, and wherein an air temperature sensor is so arranged and operatively connected with said temperature sensing means that the cooling element temperature level or levels, by which the sensing means perform their control operations, are increased at a predetermined rate in automatic response to increase of the temperature of the air as blown again the cooling element.

6. An apparatus according to claim 1 or 5, in which said sensing means are operatively connected with the fan motor so as to cause the fan speed to increase gradually in accordance with a detected cooler temperature decrease in a temperature range immediately above or about 0° C.

7. An apparatus according to claim 6, in which said sensing means are operatively connected with the fan motor and with said control means in such a manner that the control means are actuated to cause temporary heating of the cooler in response to said sensing means detecting a continued cooler temperature decrease upon having caused the fan to operate at maximum effect.

8. An apparatus according to claim 7, in which said control means are additionally operatively connected with the fan motor so as to switch off the fan by said actuation of the control means and to restart the fan upon termination of the heating of the cooler.

9. An apparatus according to claim 7, in which said cooler temperature sensing means are operatively connected with said control means such that they are caused to terminate the temporary heating of the cooler when the sensing means detect a predetermined maximum temperature, e.g. of 12° C.

10. An apparatus according to claim 8, in which the sensing means are connected with the fan so as to cause restart of the fan at relatively low effect thereof and maintain the fan operating at this low effect by a following decrease of the cooler temperature until the temperature reaches immediately above or about 0° C.

11. An apparatus according to claim 7, in which said control means include timer means operable to initiate said temporary heating of the cooler when a predetermined relatively long interval of time has lapsed since termination of the preceding temporary heating operation.

* * * * *